United States Patent [19]

Han et al.

[11] Patent Number: 4,950,829

[45] Date of Patent: Aug. 21, 1990

[54] AROMATIZATION WITH IMPROVED SELECTIVITY

[75] Inventors: Scott Han, Lawrenceville, N.J.; Sharon B. McCullen, Newtown, Pa.

[73] Assignee: Mobil Oil Corporation, New York, N.Y.

[21] Appl. No.: 229,199

[22] Filed: Aug. 8, 1988

Related U.S. Application Data

[63] Continuation-in-part of Ser. No. 57,841, Jun. 6, 1987, abandoned.

[51] Int. Cl.$^5$ ................................................ C07C 2/00
[52] U.S. Cl. .................................. 585/417; 585/415; 502/77
[58] Field of Search ............................... 585/415, 417

[56] References Cited

U.S. PATENT DOCUMENTS

| | | | |
|---|---|---|---|
| 4,273,753 | 6/1981 | Chang | 423/328 |
| 4,302,620 | 11/1981 | Chu | 585/467 |
| 4,576,805 | 3/1986 | Chang et al. | 502/77 |
| 4,590,323 | 5/1986 | Chu | 585/417 |

FOREIGN PATENT DOCUMENTS 0100119  2/1984  European Pat. Off. .

OTHER PUBLICATIONS

V. J. Frillette, W. O. Haag, & R. M. Lago, "Catalysis by Crystalline Aluminosilicates: Characterization of Intermediate Pore-Size Zeolite by the 'Constraint Index'", Journal of Catalysis, vol. 67, No. 1, Jan. 1981.

*Primary Examiner*—Asok Pal
*Attorney, Agent, or Firm*—Alexander J. McKillop; Charles J. Speciale; Marina V. Schneller

[57] ABSTRACT

The invention is directed to aromatization of hydrocarbons of low octane value to produce aromatics over a catalyst composition comprising a zeolite type material which has been treated with the chloride of an oxophilic element such as Si on Ti.

26 Claims, 2 Drawing Sheets

AROMATIZATION WITH IMPROVED SELECTIVITY

CROSS-REFERENCE TO RELATED APPLICATIONS

This application is a continuation-in-part of Ser. No. 057,841, filed Jun. 6, 1987, now abandoned.

FIELD OF THE INVENTION

The invention is directed to catalytically aromatizing low octane hydrocarbons, both olefins and alkanes, to aromatics over a catalyst comprising a zeolite modified by treatment with a chloride of an oxophilic element. The catalytic conversion exhibits high selectivity and unexpectedly high activity for high octane aromatic products.

BACKGROUND OF THE INVENTION

Naturally occurring and synthetic zeolites have been demonstrated to exhibit catalytic properties for various types of hydrocarbon conversions. Certain zeolites are ordered porous crystalline aluminosilicates having definite crystalline structure as determined by X-ray diffraction studies. Such zeolites have pores of uniform size which are uniquely determined by structure of the crystal. The zeolites are referred to as "molecular sieves" because the uniform pore size of a zeolite material may allow it to selectively adsorb molecules of certain dimensions and shapes.

By way of background, one authority has described the zeolites structurally, as "framework" aluminosilicates which are based on an infinitely extending three-dimensional network of $AlO_4$ and $SiO_4$ tetrahedra linked to each other by sharing all of the oxygen atoms. Furthermore, the same authority indicates that zeolites may be represented by the empirical formula $$M_{2/n}O.Al_2O_3.xSiO_2.YH_2O$$

In the empirical formula, x is equal to or greater than 2, since $AlO_4$ tetrahedra are joined only to $SiO_4$ tetrahedra, and n is the valence of the cation designated. M. D. Breck, ZEOLITE MOLECULAR SIEVES, John Wiley & Sons, New York p. 5 (1974). In the empirical formula, the ratio of the total of silicon and aluminum atoms to oxygen atoms is 1:2. M was described therein to be sodium, potassium, magnesium, calcium, strontium and/or barium, which complete the electrovalence makeup of the empirical formula.

The prior art describes a variety of synthetic zeolites. These zeolites have come to be designated by letter or other convenient symbols, as illustrated by the zeolite. The silicon/aluminum atomic ratio of a given zeolite is often variable. Moreover, in some zeolites, the upper limit of the silicon/aluminum atomic ratio is unbounded. ZSM-5 is one such example wherein the silicon/aluminum atomic ratio is up to infinity. U.S. Pat. No. 3,941,871, reissued as RE. 29,948, discloses a porous crystalline silicate made from a reaction mixture containing no deliberately added aluminum and exhibiting the X-ray diffraction pattern characteristic of ZSM-5.

Crystalline silicate ZSM-5 and its conventional preparation are taught by U.S. Pat. No. 3,702,886, the entire disclosure of which is incorporated herein by reference. It has a distinctive X-ray diffraction pattern which identifies it from other known crystalline silicates which is also described in U.S. Pat. No. 3,702,886, the entire contents pertaining to said X-ray. A crystalline silicate composition having the structure of ZSM-5 is taught in U.S. Pat. RE. No. 29,948, the entire disclosure of which is incorporated herein by reference. ZSM-5 is a zeolite which has a Constraint Index of 1 to 12. The method of determining Constraint Index and other zeolites having a Constraint Index of 1 to 12 is described by V. J. Frilette et al. *Journal of Catalysis*, Vol. 67, pp. 218-222 (1981).

The foregoing zeolites are included in a class of zeolites sometimes referred to as medium pore-size zeolites. The pore sizes of these zeolites range from about 5 to about 8 Angstroms.

Another class of zeolites sometimes referred to as large pore zeolites are zeolites whose pore sizes are greater than those of the medium pore zeolites, for example, greater than about 7 Angstroms. Typical examples of these are zeolites X, Y, L, A and Beta.

U.S. Pat. No. 4,590,323, related to aromatizing alkanes, describes titanium oxide modifier for zeolites. Inclusion of elements in addition to silicon, aluminum and oxygen can alter the properties of zeolites in specific catalytic conversions, for which they are used. The exact silica:alumina ratio of a zeolite can alter its properties in catalysis. In some zeolites, the silica:alumina ratio can be controlled during synthesis. Zeolite silica:alumina ratio can be varied by treatment of the as-synthesized zeolite. In N. W. Anderson et al. "Zeolites Treated with Silicon Tetrachloride Vapor", *J. Chem Soc., Faraday Trans.* 1, Part 1, Vol. 82, p. 1449-1469 (1986), dealumination of zeolites is described. Also see G. W. Skeels et al. ZEOLITE CHEMISTRY-"Substitution of Silicon for Aluminum in Zeolites via Reaction with Aqueous Fluorosilicate", 16th Inter. Zeolite Conf., Reno, p. 87-96 (1983) and H. K. Berger et al., ed. B. Imelik et al., "A New Method for the Dealumination of Faujasite-Type Zeolites", p. 203 (1980). In Berger et al., "Preparation of High-silica Faujasites by Treatment with Silicon Tetrachloride", *J. Chem. Soc.*, Faraday Trans. 1, 81, p. 2889-2901 (1985).

Various patents describe inclusion of elements other than silicon and aluminum in the preparation of zeolites. Cf. U.S. Pat. No. 3,530,064, U.S. Pat. Nos. 4,208,305 and 4,238,318 describe the preparation of silicates in the presence of iron.

SUMMARY OF THE INVENTION

The invention is directed to catalytic aromatization of hydrocarbons characterized by high aromatic product selectivity. The catalyst is prepared by treating a zeolite with gaseous $MCl_4$, at elevated temperatures and then air calcined. Catalysts prepared in this manner show increased aromatic selectivities over metal fluoride, e.g. $(NH_4)_2SiF_6$, treated zeolites as well as synthesized zeolites (independent of $SiO_2/Al_2O_3$ ratio).

DETAILED DESCRIPTION OF THE INVENTION

Figure 1:
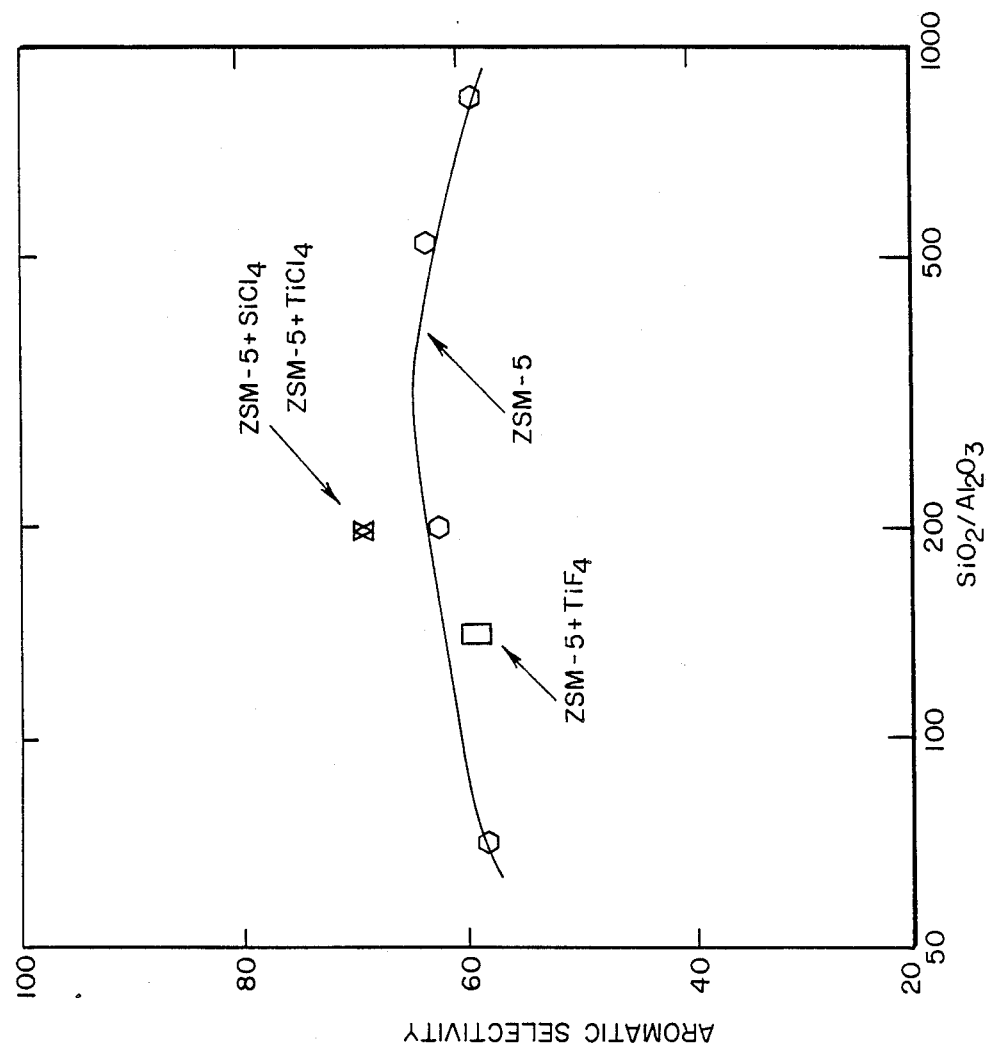
FIG. 1 is a graph of aromatic selectivity plotted against the $SiO_2/Al_2O_3$ ratio of the catalyst.

The hydrocarbon feeds which can be used in aromatizations of the invention are those containing alkanes and/or paraffins, including olefins of low octane value.

A suitable feed may be a petroleum refinery stream having a boiling point at atmospheric pressure of less than about 300° F. (about 149° C.), e.g. a gasoline stream from an atmospheric distillation column derived from a paraffinic crude. Thus the feedstock can comprise $C_2$-$C_{12}$ alkanes and $C_2$-$C_{12}$ olefins and admixtures thereof.

Such a feed is contacted with the catalyst under aromatization conditions. Aromatization conditions include a temperature of from about 200° C. to about 700° C., preferably from 300° C. to 600° C., a pressure of from about 0.1 atmosphere to about 60 atmospheres, preferably from atmospheric to about 10 atmospheres, a liquid hourly space velocity (LHSV) of from about 0.1 to about 400, preferably from 0.1 to about 10 and a hydrogen/hydrocarbon mole ratio of from about 0 to about 20.

The aromatization catalyst of the invention comprises a zeolite modified by treatment of the zeolite with the tetrachloride of an oxyphilic tetravalent element.

The identity of the zeolite, as determined by X-ray diffraction, can be one of those having a pore size greater than about 5 Angstroms. Accordingly, the zeolites designated medium pore and zeolite beta may be treated for catalysis in accordance with the invention. By the term zeolite, applicants intend to embrace those compositions in which the Si:Al ratio ranges to infinity.

Medium pore zeolites include those having a Constraint Index of 1-12. Constraint Index is a number resulting from an experimental measurement which was described by V. J. Frilette et al. JOURNAL OF CAT., Vol. 67, p. 218-222 (1981), which is relied upon and incorporated by reference herein. ZSM-5 is a zeolite whose Constraint Index varies with temperature but which remains within the range of 1 to 12.

ZSM-5 and metal-containing ZSM-5 have been reported for light hydrocarbon aromatization, e.g. N. Y. Chen and T. Y. Yan, "M2-Forming-A Process for Aromatization of Light Hydrocarbons", I&EC Process Res. and Dev., 1986, 25, 151. The extinction aromatic selectivity of ZSM-5 has been shown to increase only slightly with increasing $SiO_2/Al_2O_3$ ratio. The phrase "extinction aromatic selectivity" is intended to refer to that stage of the process described herein, wherein all $C_2^+$ aromatizables are consumed.

The tetrachloride form, $MCl_4$ above, of the tetravalent oxyphile is apparently critical, as the tetrafluoride form does not achieve the same increased aromatic selectivity as that of tetrachloride form, as illustrated in examples below. The tetravalent oxyphile element is preferably free of dehydrogenation activity. In the examples below, the tetravalent oxyphile is Ti(IV) or Si(IV).

Treatment of the zeolite with the tetrahalide is preferably undertaken in an atmosphere inert to oxyphile-oxide formation. The treatment is undertaken at temperatures in the ranges of the boiling points of the tetrahalide inert atmospheres for said treatment include atmospheres free of water and water vapor. Inert conditions do not appear to require the exclusion of oxygen. Preferably, the zeolite is contacted with the tetravalent oxyphile in the vapor state.

It may be desirable to incorporate the above-described crystalline material with a matrix comprising another material. Such matrix material is useful as a binder and imparts greater resistance to the catalyst for temperature, pressure and reactant feed stream velocity conditions encountered in many processes.

Useful matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment of chemical modification.

In addition to the foregoing materials, the zeolites employed herein may be composited with a porous matrix material such as alumina, silica-alumina, silica-magnesia, silica-zirconia, silica-thoria, silica-beryllia and silica titania, as well as ternary compositions, such as silica-thoria, silica-alumina-zirconia, silica-alumina-magnesia and silica-magnesia-zirconia. The matrix may be in the form of a cogel. The relative proportions of activity enhanced zeolite component and inorganic oxide gel matrix, on an anhydrous basis, may vary widely with the zeolite content ranging from between about 1 to about 99 percent by weight and more usually in the range of about 5 to about 80 percent by weight of the dry composite.

The selectivity of the catalysis of the invention for aromatic product production was determined by the formula $$\frac{\text{total weight of aromatics } (BTX, \text{ \& all } C_8 \text{ \& } C_9{}^+ \text{ aromatics})}{100 - (\text{weight percent of } C_2^{=+} \text{ aromatizables})}$$

The total weight of aromatics produced in the process and referred in the formula was determined by gas chromatography.

That selectivity for aromatic product by catalysis is significant in petroleum refining because it provides an alternative to the art for upgrading feeds containing hydrocarbons of low octane value by converting the low octane value components to aromatics of higher octane value to thereby increase the motor octane value.

The invention will be illustrated by the following examples:

EXAMPLE 1

HZSM-5 with $SiO_2/Al_2O_3=70:1$ was treated with $SiCl_4$ (g) in $N_2$ at 350°-450° C. for 4-6 hours, then air calcined at 538° C. for 2 hours. The $SiCl_4$ treated ZSM-5 was exchanged with 1M $NH_4NO_3$ for one hour at room temperature then treated with $NH_3$ (g). The effective $SiO_2/Al_2O_3$ ratio of Si-ZSM-5 was 130:1 determined by $NH_3$-TPD.

EXAMPLE 2

Si-ZSM-5 was prepared as described in Example 1. The conversion of a $C_6/C_7$ paraffinic naphtha was tested at 538° C. and 0.5 LHSV. Detailed feed properties are shown in Table 1. The reaction products were analyzed for $H_2$, $CH_4$, $C_2H_6$, benzene, toluene, $C_8$- and $C_9$-aromatic distribution, the $C_2$ yield and the aromatic selectivity (Table 2). $C_2^{=+}$ yield is defined as $C_2+C_3+$ non-aromatic hydrocarbons, and the aromatic selectivity is defined as the total aromatic yield/(100-$C_2=+$). The aromatic selectivity and product distribution are shown in Table 2.

TABLE 1

| Feedstock Properties | |
|---|---|
| Boiling Range | 180° F.–250° F. |
| Density at 60° F. | 0.6914 |
| Hydrogen, wt. % | 15.55 |
| Sulfur, ppmw | 0.02 |
| Nitrogen, ppmw | 0.02 |
| Paraffins, wt. % | 81.3 |
| Naphthenes, wt. % | 13.3 |
| Aromatics, wt. % | 5.4 |
| $C_5$, wt. % | 2.7 |
| $C_6$, wt. % | 49.8 |
| $C_7$, wt. % | 47.2 |
| $C_8$, wt. % | 0.3 |

TABLE 2

| Run | A | B* |
|---|---|---|
| Product, wt. % | | |
| $H_2$ | 1.45 | 2.9 |
| $C_1 + C_2$ | 14.62 | 15.71 |
| Benzene | 8.21 | 7.82 |
| Toluene | 15.41 | 16.75 |
| $C_8$ Aromatics | 8.94 | 9.89 |
| $C_9^+$ Aromatics | 3.87 | 3.68 |
| $C_2=+$ | 55.71 | 43.25 |
| Aromatic Selectivity | 69 | 67 |

*Run B was undertaken under the same condition but for a long on stream period of time.

EXAMPLES 3–6

Several HZSM-5 samples with as-synthesized $SiO_2/Al_2O_3$ ratios of 70:1, 200:1, 520:1 and 850:1 were tested as described in Example 2. The product distributions and aromatic selectivities are shown in Table 3.

TABLE 3

| | Example 3 | Example 4 | Example 5 | Example 6 |
|---|---|---|---|---|
| Product Product, wt. % | | | | |
| $H_2$ | 0.30 | 0.50 | 0.10 | 0.10 |
| $C_1 + C_2$ | 26.08 | 21.88 | 15.67 | 10.25 |
| Benzene | 9.74 | 6.74 | 4.17 | 2.79 |
| Toluene | 15.87 | 14.41 | 9.64 | 5.58 |
| $C_8$ Aromatics | 8.10 | 10.24 | 8.03 | 3.46 |
| $C_9^+$ Aromatics | 2.90 | 5.10 | 5.65 | 2.56 |
| $C_2=+$ | 37.30 | 41.62 | 56.84 | 75.36 |
| Aromatic Selectivity | 58 | 62 | 64 | 58 |

The data from Examples 2–6 are summarized in FIG. 1. It shows that the aromatic selectivity observed for Si/Cl$_4$-treated ZSM-5 is not a function of the zeolite $SiO_2/Al_2O_3$ ratio.

EXAMPLE 7

Ammonium fluorosilicate has been shown to generate the $SiF_4$ species in solution (6). Fifty g of $(NH_4)$ZSM-5 were added to 70 ml of a 0.55M $(NH_4)_2$ $SiF_6$ solution, then heated and stirred in a plastic bottle at 85° C. for 18 hours. The product was washed, exchanged with 1M $NH_4NO_3$ and air calcined. The effective $SiO_2/Al_2O_3$ ratio was 109:1 measured by $NH_3$-TPD. The sample was tested as described in Example 2. The product distribution and aromatic selectivity are shown in Table 4. The aromatic selectivity, 59 wt. %, is much lower than that observed for the SiCl$_4$-treated ZSM-5, 68 wt. %. This result demonstrates that SiCl$_4$ treatment leads to a novel catalyst composition.

TABLE 4

| Run No. | C |
|---|---|
| Product, wt. % | |
| $H_2$ | 2 |
| $C_1 + C_2$ | 33.11 |
| Benzene | 12.33 |
| Toluene | 21.30 |
| $C_8$ Aromatics | 10.27 |
| $C_9^+$ Aromatics | 8.54 |
| $C_2=+$ | 12.45 |
| Aromatic Selectivity | 59 |

EXAMPLE 8

HZSM-5 with $SiO_2/Al_2O_3=70:1$ was treated with $TiCl_4$ (g) in $N_2$ at 350°–450° C. for 4–6 hours, then air calcined at 538° C. for 2 hours. The $TiCl_4$ treated ZSM-5 was exchanged with 1M $NH_4NO_3$ at room temperature for one hour, then treated with $NH_3$ (g) at room temperature. The effective $SiO_2/Al_2O_3$ ratio of Ti-ZSM-5 was 250:1. The Ti-ZSM-5 was tested as described in Example 2. The product distribution and aromatic selectivity is shown in Table 5.

TABLE 5

| Run No. | D | E | F |
|---|---|---|---|
| Product, wt. % | | | |
| $H_2$ | 2.1 | 1.8 | 1.8 |
| $C_1 + C_2$ | 28.60 | 29.00 | 21.59 |
| Benzene | 13.53 | 13.60 | 10.90 |
| Toluene | 22.56 | 22.57 | 20.25 |
| $C_8$ Aromatics | 12.33 | 12.13 | 12.61 |
| $C_9^+$ Aromatics | 9.66 | 6.21 | 10.86 |
| $C_2=+$ | 11.35 | 14.71 | 22.10 |
| Aromatic Selectivity | 67 | 65 | 71 |

Figure 2:
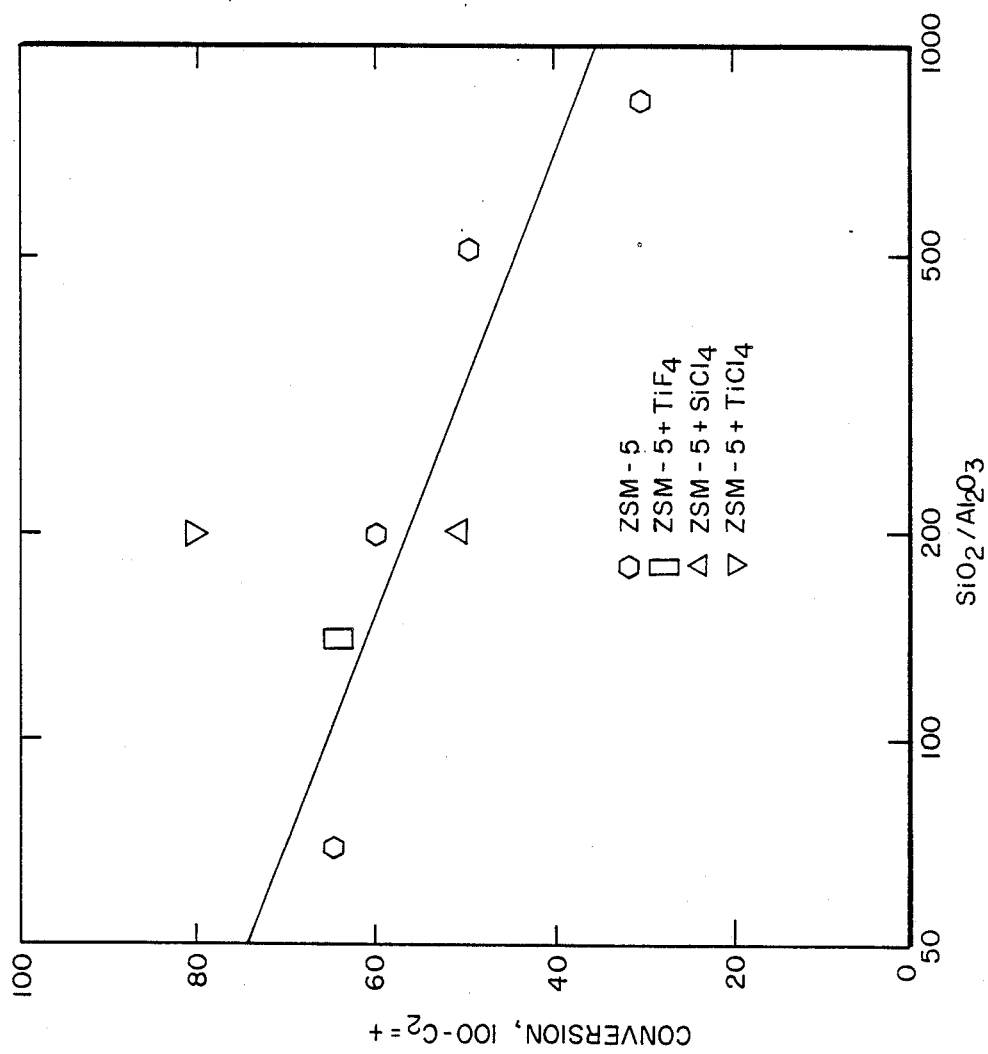
FIG. 2 is a graph of $C_2=+$ yield (defined as $C_2=+C_3+$ non-aromatic hydrocarbons) plotted against $SiO_2/Al_2O_3$ ratio of the catalyst.

The aromatic selectivity is plotted in FIG. 1 as a function of effective $SiO_2/Al_2O_3$ ratio. The aromatic selectivity of Ti-ZSM-5 is not a function of the zeolite $SiO_2/A_2O_3$ ratio. The catalyst activity, FIG. 2, is also much higher than predicted by the $SiO_2/Al_2O_3$ ratio.

EXAMPLE 9

A slurry of 0.25 g TiF$_4$ and 3.0 g of $(NH_4)$ZSM-5 with $SiO_2/Al_2O_3=70:1$ was mixed thoroughly in 100 ml D.I. $H_2O$ and left to digest in a plastic bottle at 85° C. for 18 hours. The resultant product was washed, exchanged with 1M $NH_4NO_3$ and then air calcined. The effective $SiO_2/Al_2O_3$ ratio was 140:1 by $NH_3$-TPD. The sample was tested as described in Example 2 and the product distribution and aromatic selectivity are found in Table 6. The aromatic selectivity, 63 wt. %, was much lower than that observed for the TiCl$_4$ treated ZSM-5, 69 wt. %. This comparison shows that TiCl$_4$ treatment, like SiCl$_4$, leads to a novel catalyst.

TABLE 6

| Run No. | G | H |
|---|---|---|
| Product, wt. % | | |
| $H_2$ | 0.40 | 0.30 |
| $C_1 + C_2$ | 22.17 | 27.11 |
| Benzene | 7.30 | 6.03 |
| Toluene | 15.16 | 14.65 |
| $C_8$ Aromatics | 10.42 | 11.50 |
| $C_9^+$ Aromatics | 5.71 | 5.09 |
| $C_2=+$ | 38.84 | 35.33 |
| Aromatic Selectivity | 63 | 58 |

In accordance with the invention, there has been provided a method of treating a zeolite for use in catalytic aromatization to increase its selectivity therein, notwithstanding the fact that the zeolite has not been modified to contain conventional hydrogenation/dehydrogenation metal(s). While invention has been described in conjunction with specific embodiments, it is evident that many alternatives, modifications, and variations will be apparent to those skilled in the art in the light of the foregoing description. Accordingly, it is intended to embrace all such alternatives, modifications and variations as fall within the spirit and broad scope of the appendix claims.

What is claimed is:

1. A process for increasing the aromatic product selectivity of a catalytic conversion of low octane hydrocarbons to aromatics by aromatization catalyzed by a zeolite, wherein the process comprises:
   providing a feed of said low octane $C_2$–$C_{12}$ hydrocarbons;
   contacting said feed with a catalyst free of a dehydrogenation/hydrogenation metal and comprising a silicate having the X-ray diffraction pattern of a zeolite of Constraint Index of 1 to 12, under aromatization conditions wherein the silicate has been modified to increase its selectivity for aromatic products under said aromatization conditions, wherein the silicate is modified by treating it with an oxyphile in an atmosphere inert to oxide formation of the oxyphile, wherein the oxyphile is a tetrachloride of titanium or silicon wherein treating comprises passing the tetrachloride in the vapor state over the silicate and thereby forming a precalcined catalyst and then calcining the precalcined catalyst; undertaking said contacting at conditions including a liquid hourly space velocity (LHSV) of 0.1 to 10, from ambient pressure to a pressure of 100 psig at a temperature of 300° C. to 600° C.; recovering said aromatics.

2. The process of claim 1 wherein the silicate is modified in the absence of water.

3. The process of claim 1 wherein the silicate is modified in the absence of reagents containing functional groups which include oxygen atoms.

4. The process of claim 1 wherein the feed includes alkanes, olefins, or admixtures thereof.

5. The process of claim 1, wherein the zeolite is ZSM-5.

6. The process of claim 1, wherein the treated silicate is ammonium ion exchanged.

7. The process of claim 6, wherein the silicate is heated to a temperature effective to evolve $NH_3$.

8. A process for decreasing the $C_6$ and $C_7$ paraffin content of a naphtha feed, comprising
   (a) providing a naphtha feed having a $C_6$ and $C_7$ paraffin content;
   (b) contacting said feed with a catalyst free of a dehydrogenation/hydrogenation metal and comprising a silicate having the X-ray diffraction pattern of a zeolite of Constraint Index of 1 to 12, under aromatization conditions wherein the silicate has been modified to increase its selectivity for aromatic products under said aromatization conditions, wherein the silicate is modified by treating it with an oxyphile in an atmosphere inert to oxide formation of the oxyphile, wherein the oxyphile is a tetrachloride of titanium or silicon wherein treating comprises passing the tetrachloride in the vapor state over the silicate to form and thereby forming a precalcined catalyst and then calcining the precalcined catalyst; undertaking said contacting at conditions including a liquid hourly space velocity (LHSV) of 0.1 to 10, from ambient pressure to a pressure of 100 psig at a temperature of 300° C. to 600° C.; and recovering said aromatics; and
   (c) recovering an effluent with a $C_6$ and $C_7$ paraffin content which is less than that of the naphtha feed, and with an aromatic content which exceeds aromatic content of the feed.

9. The process of claim 8, wherein the silicate is modified in the absence of water.

10. The process of claim 8, wherein the silicate is modified in the absence of reagents containing functional groups which include oxygen atoms.

11. The process of claim 8, wherein the feed includes alkanes, olefins, or admixtures thereof.

12. The process of claim 8, wherein the zeolite is ZSM-5.

13. The process of claim 8, wherein the treated silicate is ammonium ion exchanged.

14. The process of claim 8, wherein the silicate is heated to a temperature effective to evolve $NH_3$.

15. The process of claim 8, wherein the oxyphile is $TiCl_4$.

16. The process of claim 14, wherein the oxyphile is $TiCl_4$.

17. The process of claim 8, wherein the oxyphile is $SiCl_4$.

18. The process of claim 14, wherein the oxyphile is $SiCl_4$.

19. The process of claim 1, wherein the oxyphile is $SiCl_4$.

20. The process of claim 7, wherein the oxyphile is $SiCl_4$.

21. The process of claim 1, wherein the oxyphile is $TiCl_4$.

22. The process of claim 7, wherein the oxyphile is $TiCl_4$.

23. The process of claim 1, wherein the catalyst consists essentially of said silicate.

24. The process of claim 8, wherein the catalyst consists essentially of said silicate.

25. The process of claim 15, wherein the catalyst consists essentially of said silicate.

26. The process of claim 19, wherein the catalyst consists essentially of said silicate.

* * * * *